US012237120B2

(12) United States Patent
Vona

(10) Patent No.: US 12,237,120 B2
(45) Date of Patent: Feb. 25, 2025

(54) THREE BUTTON CONTROL STATION DISABLER

(71) Applicant: Nicholas P. Vona, Warwick, RI (US)

(72) Inventor: Nicholas P. Vona, Warwick, RI (US)

( * ) Notice: Subject to any disclaimer, the term of this patent is extended or adjusted under 35 U.S.C. 154(b) by 210 days.

(21) Appl. No.: 17/387,080

(22) Filed: Jul. 28, 2021

(65) Prior Publication Data

US 2022/0037099 A1 Feb. 3, 2022

Related U.S. Application Data

(60) Provisional application No. 63/057,974, filed on Jul. 29, 2020.

(51) Int. Cl.
*H01H 13/04* (2006.01)
*H01H 13/02* (2006.01)
*H01H 13/14* (2006.01)

(52) U.S. Cl.
CPC .......... *H01H 13/04* (2013.01); *H01H 13/023* (2013.01); *H01H 13/14* (2013.01)

(58) Field of Classification Search
CPC ...... H01H 13/04; H01H 13/023; H01H 13/14; H01H 9/287; H01H 9/286; H01H 2221/068; H01H 2300/024; H01H 9/02; H01H 13/02
USPC .......................................................... 200/333
See application file for complete search history.

(56) References Cited

U.S. PATENT DOCUMENTS 4,334,134 A * 6/1982 Janda ..................... H01H 9/182 200/333
6,720,512 B1 * 4/2004 Rothbauer ............... H02G 3/14 200/333
8,410,384 B2 * 4/2013 da Silva ................. H01H 23/16 200/333

* cited by examiner

*Primary Examiner* — Lheiren Mae A Caroc
(74) *Attorney, Agent, or Firm* — Adler Pollock & Sheehan P.C.

(57) ABSTRACT

A disabler cover plate includes a generally flat longitudinal surface, an upper hook extending approximately 90° from a top of an underside of the flat longitudinal surface, a lower hook extending approximately 90° from a bottom of the underside of the flat longitudinal surface, and a bump out on the underside of the flat longitudinal surface, the bump out positioned to depress and maintain pressure on a button on a face of a PBS-3 fixture.

10 Claims, 4 Drawing Sheets

THREE BUTTON CONTROL STATION DISABLER

CROSS REFERENCE TO RELATED APPLICATIONS

This application claims benefit from U.S. Provisional Patent Application Ser. No. 63/057,974, filed Jul. 29, 2020, which is incorporated by reference in its entirety.

BACKGROUND OF THE INVENTION

The present invention relates generally to an electrical control apparatus, and more specifically to a three button control station disabler.

In general, a common method of controlling an electrically operated door, such as a garage door having a garage door opener device is a three button control station (PBS-3). The PBS-3 typically includes three buttons, i.e., an open button, a close button and a stop button. The three buttons are typically part of a single enclosure and a momentary impulse from the appropriate button will activate the garage door opener (and thus move the garage door).

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In an aspect, the invention features a disabler cover plate including a generally flat longitudinal surface, an upper hook extending approximately 90° from a top of an underside of the flat longitudinal surface, a lower hook extending approximately 90° from a bottom of the underside of the flat longitudinal surface, and a bump out on the underside of the flat longitudinal surface, the bump out positioned to depress and maintain pressure on a button on a face of a PBS-3 fixture.

In another aspect, the invention features an apparatus including a three button control station (PBS-3) fixture, the PBS-3 fixture including a face including a first button, a second button and a third button, and a disabler cover plate, the disabler cover plate configured to releasably snap over the PBS-3 fixture and depress and maintain pressure on the third button.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

These and other features, aspects, and advantages of the present invention will become better understood with reference to the following description, appended claims, and accompanying drawings where:

DETAILED DESCRIPTION

Figure 1:
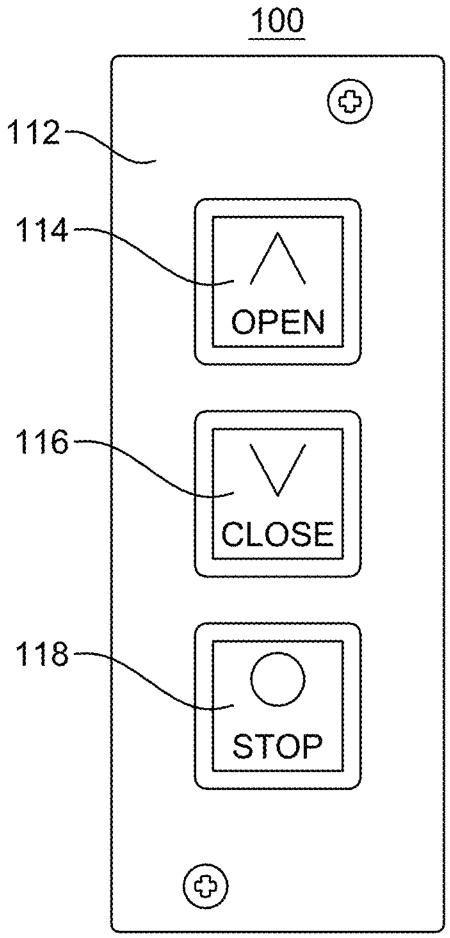
FIG. 1 is a front prospective of an exemplary three button control station (PBS-3).

The subject innovation is now described with reference to the drawings, wherein reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As shown in FIG. 1, a front prospective of an exemplary three button control station (hereinafter referred to as "PBS-3") 100 includes an enclosure 112. The enclosure 112 houses a PBS-3 100 circuitry that is linked to three spring loaded buttons 114, 116, 118. In the embodiment illustrated, button 114 is an open button, button 116 is a close button and button 118 is a stop button.

In operation, the PBS-3 100 circuitry is connected to an electrical door opening device, such as a garage door opener. Pressing the open button 114 causes the PBS-3 100 circuitry to open the electrical door opening device. Pressing the close button 116 causes the PBS-3 100 circuitry to close the electrical door opening device. Pressing the stop button 118 causes the PBS-3 100 circuitry to stop the electrical door opening device.

The buttons 114, 116 and 118 are most typically spring loaded. For example, pressing the open button 114 causes momentary contact in PBS-3 100 circuitry to open the electrical door opening device. Pressing the close button 116 causes momentary contact in PBS-3 100 circuitry to close the electrical door opening device. Pressing the stop button 118 causes momentary contact in PBS-3 100 circuitry to stop the electrical door opening device.

There are times in which the stop button 118 requires activation over an extended period of time in order to disable the open button 114 and close button 116. For example, during a time when maintenance is being performed on the electrical door opening device, the open button 114 and close button 116 should be disabled in order to protect a user performing the maintenance. One can disable the open button 114 and close button 116 by manually applying constant pressure on the stop button 118. So long as manual pressure remains on the stop button 118, the PBS-3 100 circuitry prevents operation of the open button 114 and the close button 116.

Figure 2:
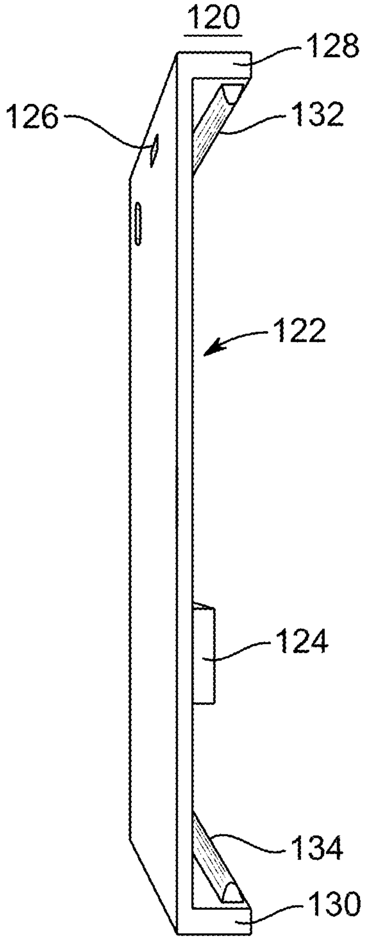
FIG. 2 is a side prospective of an exemplary disabler cover plate.
Figure 3:
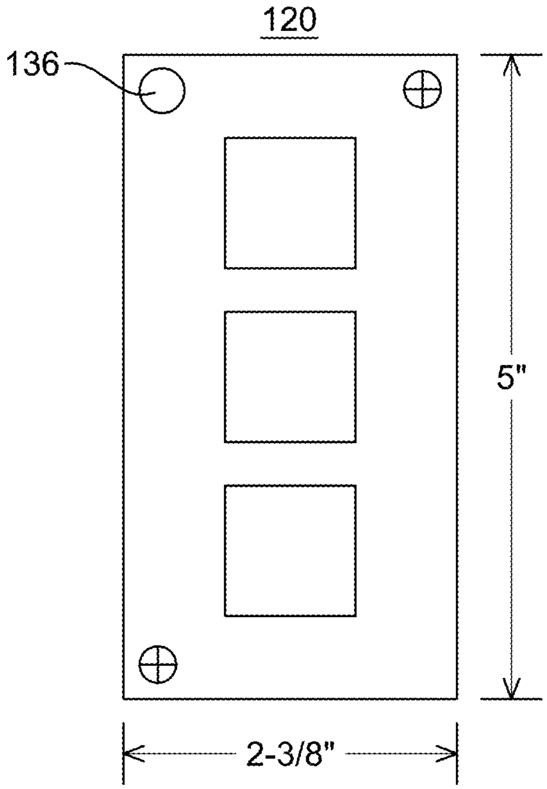
FIG. 3 is a front view of a PBS-3 fixture.

As shown in FIG. 2, an exemplary disabler cover plate 120 of the present invention is designed to removably snap over a face of the PBS-3 100. An inside face 122 of the disabler cover plate 120 includes a projection 124 such that when the disabler cover plate 120 is snapped on to and over the PBS-3 100 the projection 124 depresses the stop button 118. As described above, when the stop button 118 remains depressed, the open button 114 and close button 116 cannot function. In effect, applying pressure on the stop button 118 by the projection 124 removes circuit power control of an operator. In addition, the disabler cover plate 120 covers all three buttons 114, 116, 116.

In embodiments, an exterior face of the disabler cover plate 120 may be adorned with information messages, such as, for example, DO NOT OPERATE, OUT OF ORDER, and so forth.

In one embodiment, the exterior face of the disabler cover plate 120 includes a slot 126 that may be used to pry the disabler cover plate 120 off the PBS-3 100.

In general, the disabler cover plate 120 is designed to be slightly larger than a height of a PBS-3 fixture and approximately the same width, fully covering control buttons 114, 116, 118 on the PBS-3 fixture 100. The disabler cover plate 120 plate may also include a circular cutout 136 in a top corner for a troubleshoot indicator light that is included in some PBS-3 fixtures.

The disabler cover plate 120 may be constructed such that it has a length of 5 inches and a width of 2⅜ inches, for example.

The disabler cover plate 120 generally has a "C" shape with hook arms 128, 130 on a top and bottom when viewed from a side. The hook arms 128, 130 include inward-facing flanges 132, 134 for engaging respective ends of the PBS-3 to allow the disabler cover plate 120 to be releasably snapped into place.

Figure 5:
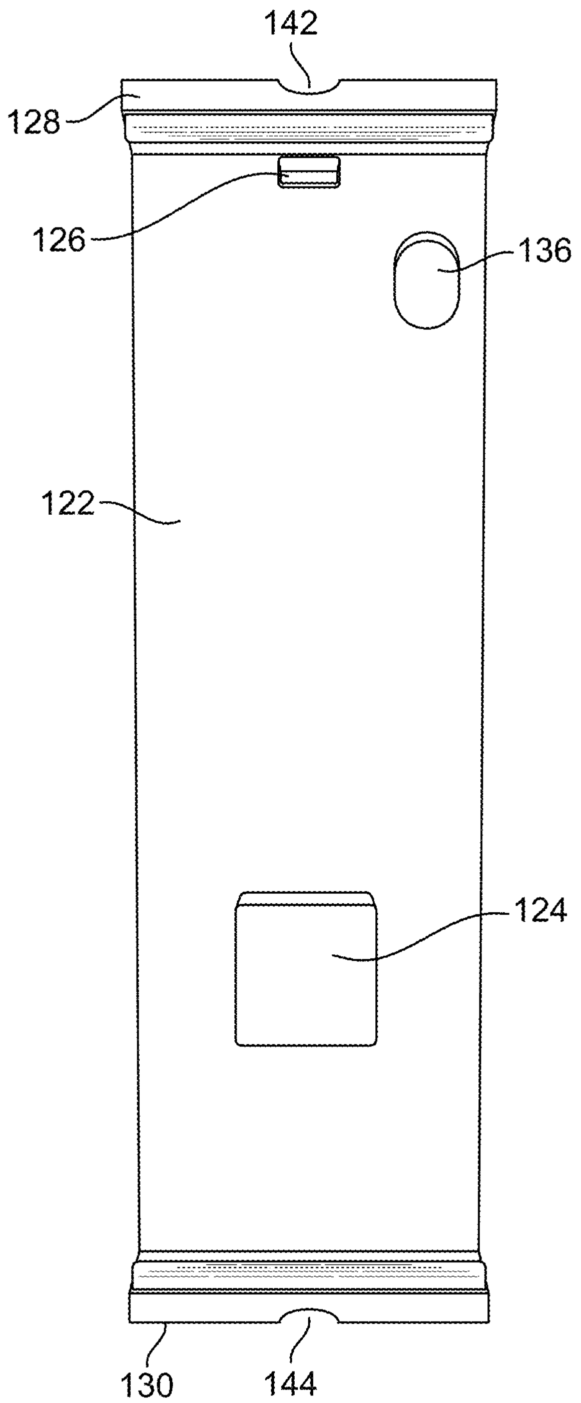
FIG. 5 is a view of the underside of the exemplary disabler cover.

In some embodiments, as shown in FIG. 5, the top and bottom hook arms 128, 130 of the disabler cover plate 120 include small indentations 142, 144 to enable them to be snapped over PBS-3 fixtures that include conduit screws or other hardware that may impede attachment.

Figure 4:
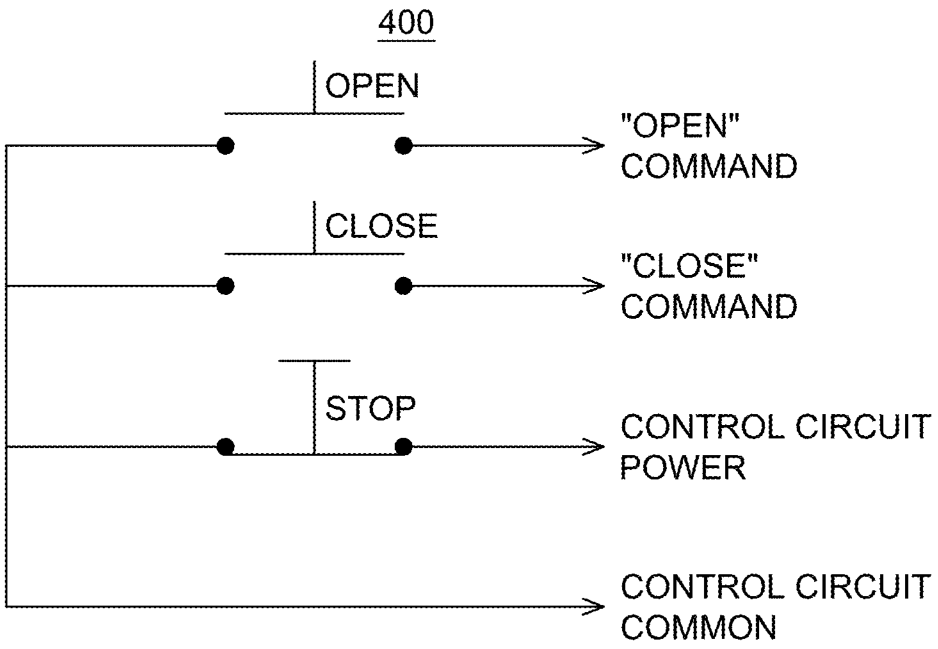
FIG. 4 is an exemplary wiring diagram.

In FIG. 4, an exemplary wiring diagram 400 is illustrated.

The disabler cover plate 120 of the present invention also disables remote controls from activating the operator and any other push button stations that may be wired to the operator in remote locations. Moreover, the disabler cover plate 120 of the present invention can be used to prevent operation of a damaged door until proper repairs can be made by trained technicians.

It should be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. A disabler cover plate for a three button control station (PBS-3) fixture, the PBS-3 fixture comprising:

a face including an open button, a close button, and a stop button, the disabler cover plate including:

a generally flat longitudinal surface;

an upper hook extending approximately 90° from a top of an underside of the flat longitudinal surface, the upper hook comprising a first inward-facing flange;

a lower hook extending approximately 90° from a bottom of the underside of the flat longitudinal surface, the lower hook comprising a second inward-facing flange opposing the first inward-facing flange; and a bump out on the underside of the flat longitudinal surface, the bump out positioned to depress and maintain pressure on the stop button on the face of the PBS-3 fixture, wherein the first and second flanges engage a first end and a second end, respectively, of the PBS-3 fixture in order to releasably retain the cover plate thereon, and wherein the flat longitudinal surface is dimensioned to cover the open button and the close button when the stop button is depressed by the bump out.

2. The disabler cover plate of claim 1 wherein the flat longitudinal surface is slightly larger than a height of the PBS-3 fixture and approximately a same width.

3. The disabler cover plate of claim 2 wherein the flat longitudinal surface is configured to affix over a cover or a face of the PBS-3 fixture.

4. The disabler cover plate of claim 3 wherein the flat longitudinal surface includes a circular cutout in a top corner for a PBS-3 troubleshoot indicator light.

5. A disabler cover plate apparatus for a three button control station (PBS-3) fixture, the PBS-3 fixture comprising:

a face including an open button, a close button, and a stop button, and the disabler cover plate apparatus including a releasably snap over the PBS-3 fixture and depress and maintain pressure on the stop button, the disabler cover plate apparatus including:

a generally flat longitudinal surface;

an upper hook extending from an underside of the flat longitudinal surface, the upper hook configured to releasably engage an upper end of the PBS-3 fixture;

a lower hook extending from an underside of the flat longitudinal surface opposing the upper hook, the lower hook configured to releasably engage a lower end of the PBS-3 fixture; and a bump out on the underside of the flat longitudinal surface, the bump out positioned to depress and maintain the stop button in a depressed position, wherein the flat longitudinal surface is dimensioned to cover the open button and the close button when the stop button is depressed by the bump out.

6. The apparatus of claim 5 wherein the flat longitudinal surface is slightly larger than a height of the PBS-3 fixture and approximately a same width.

7. The apparatus of claim 6 wherein the flat longitudinal surface is configured to affix over a cover or a face of the PBS-3 fixture.

8. The apparatus of claim 7 wherein the flat longitudinal surface includes a circular cutout in a top corner for a PBS-3 troubleshoot indicator light.

9. A disabler plate for a three button control station PBS-3 fixture, the PBS-3 fixture including an open button, a close button, and a stop button, and first and second fixture ends, the disabler plate comprising:

an elongated planar member having first and second plate ends, and dimensioned to cover the face of the PBS-3 fixture including the open button, the close button, and the stop button;

a protrusion extending from an underside of the planar member; and first and second hook arms extending downward from the first and second plate ends, respectively, the first and second hook arms configured to engage with the first and second fixture ends to retain the disabler plate on the PBS-3 fixture such that the protrusion engages the stop button and maintains the stop button in a depressed position, wherein the elongated planar member is dimensioned to cover the open button and the close button when the stop button is depressed by the protrusion.

10. The disabler plate of claim 9, further comprising a circular opening defined in the planar member corresponding to a PBS-3 indicator light.

* * * * *